W. MACK.
AQUARIUM.
APPLICATION FILED APR. 24, 1919.
1,322,322.
Patented Nov. 18, 1919.
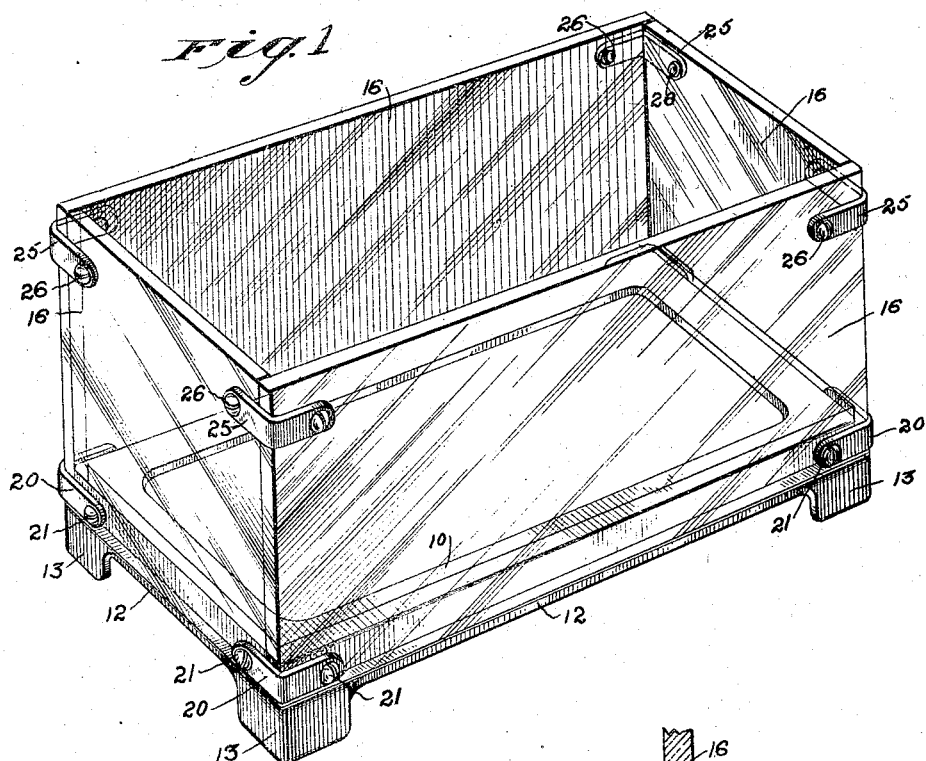
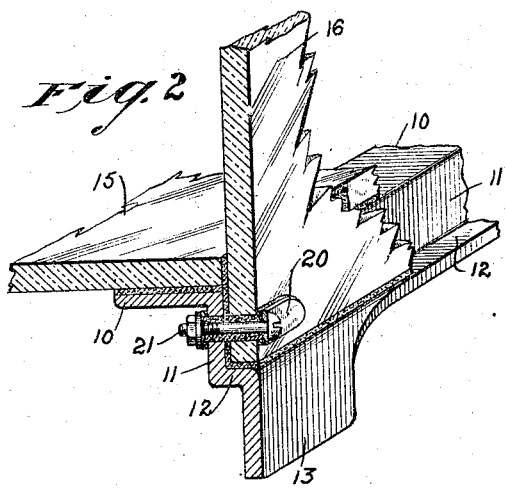
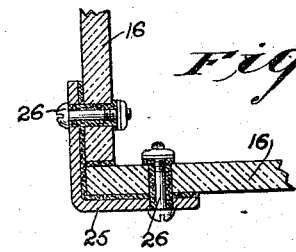
WITNESSES
INVENTOR
WILLIAM MACK
BY
ATTORNEYS

UNITED STATES PATENT OFFICE.

WILLIAM MACK, OF NEW YORK, N. Y.

AQUARIUM.

1,322,322.     Specification of Letters Patent.     Patented Nov. 18, 1919.

Application filed April 24, 1919. Serial No. 292,398.

*To all whom it may concern:*

Be it known that I, WILLIAM MACK, a citizen of the United States, and a resident of the city of New York, borough of Manhattan, in the county and State of New York, have invented a new and Improved Aquarium, of which the following is a full, clear, and exact description.

The object of the invention is to provide a new and improved aquarium which is simple and durable in construction and not liable to get out of order easily. Another object is to render the aquarium watertight.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a perspective view of the aquarium;

Fig. 2 is an enlarged sectional perspective view of a portion of the aquarium;

Fig. 3 is a sectional plan view of the corner fastening for fastening the ends of adjacent sides together.

The one-piece supporting frame 10 of the aquarium is preferably of metal, rectangular in shape, and the frame is provided at its outer margin with a depending annular flange 11, from which extends outwardly an annular ledge 12 provided at the corners with depending legs 13 for supporting the aquarium on a stand, table or other suitable support. On the frame 10 rests a bottom 15 and on the ledge 12 rest the sides 16, the said bottom 15 and the sides 16 being preferably made in the form of glass plates. The ends of adjacent sides abut one against the other, and the lower portions of the sides abut with their inner faces against the annular flange 11 and against the edges of the bottom 15.

In order to fasten the lower portions of the sides 16 to the frame flange 11 use is made of angle or corner clips 20, one for each corner, and fitting exteriorly on the end portions of adjacent sides 16 and the flange 11 to fasten the said parts together, as will be readily understood by reference to Fig. 2. Similar angle or corner clips 25 fit exteriorly against the ends of adjacent sides 16 near the upper ends thereof, and the said clips 25 are fastened to the sides 16 by bolts 26. By the arrangement described the parts forming the aquarium can be readily assembled and securely fastened in place without the aid of highly skilled labor.

In order to render the various joints watertight and to allow expansion and contraction of the parts without opening the joints, use is made of waterproof cement interposed between the bottom edges of the sides 16 and the ledge 12, between the inner faces of the sides 16, the flange 11 and the edges of the bottom 15, between the bottom 15 and the frame 10, between the abutting ends of adjacent sides, and between the clips 20 and 25 and the outer faces of the sides 16.

The bolt holes in the sides 16 and flange 11 are filled with a cementitious substance to prevent direct contact of the metal parts with the glass parts and thus compensate for the unequal expansion and contraction of the metal and glass parts.

Having thus described my invention, I claim as new and desire to secure by Letters Patent:—

1. An aquarium, comprising a metal base frame having a depending annular flange terminating in an outwardly extending annular ledge and supporting legs depending from said annular ledge, a bottom resting on the said base frame, glass sides seated on the said ledge and fitting against the frame flange and the edges of the said bottom, corner clips fitting exteriorly onto adjacent ends of the said sides opposite the said frame flange, and bolts passing through the said corner clips, the sides and the frame flange to fasten the parts together.

2. An aquarium, comprising a metal base frame having a depending annular flange terminating in an outwardly extending annular ledge and supporting legs depending from said annular ledge, a bottom resting on the said base frame, glass sides seated on the said ledge and fitting against the frame flange and the edges of the said bottom, corner clips fitting exteriorly onto adjacent ends of the said sides opposite the said frame flange, bolts passing through the said corner clips, the sides and the frame flange to fasten the said parts together, upper corner clips fitting exteriorly on the adjacent ends of the said sides near the upper ends thereof, and bolts passing through the upper corner clips and the said sides to fasten the latter together.

WILLIAM MACK.